No. 828,193. PATENTED AUG. 7, 1906.
J. CHARKY.
VEGETABLE GRATER.
APPLICATION FILED DEC. 1, 1905.
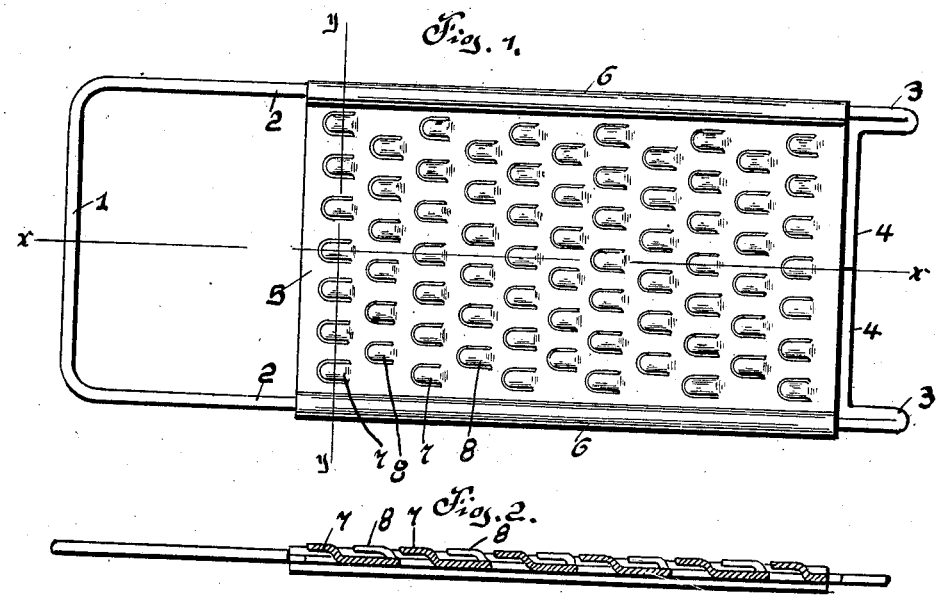
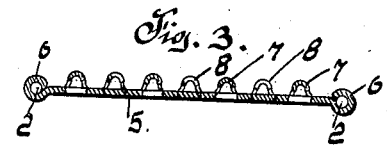
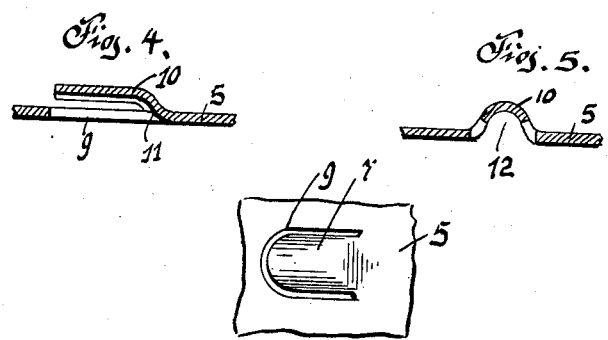
Witnesses:
C. Klostermann
P. N. Butler
Inventor.
John Charky.
by N. C. Evert & Co.
Attorneys.

UNITED STATES PATENT OFFICE.

JOHN CHARKY, OF ESPLEN BOROUGH, PENNSYLVANIA.

VEGETABLE-GRATER.

No. 828,193.      Specification of Letters Patent.      Patented Aug. 7, 1906.

Application filed December 1, 1905. Serial No. 289,813.

*To all whom it may concern:*

Be it known that I, JOHN CHARKY, a subject of the Emperor of Austria-Hungary, Franz Joseph, residing at 227 Second street, Esplen borough, in the county of Allegheny and State of Pennsylvania, have invented certain new and useful Improvements in Vegetable-Graters, of which the following is a specification, reference being had therein to the accompanying drawings.

This invention relates to certain new and useful improvements in vegetable-graters; and the primary object of this invention is to provide a simple and inexpensive grater that will thoroughly disintegrate vegetables moved back and forth upon said grater.

Briefly described, I construct my improved grater of a wire frame, which supports a perforated plate. The perforations of the plate are arranged and constructed to provide an irregular roughened surface over which the vegetables are rubbed or moved, the irregular surface of the plate cutting and disintegrating the vegetables into very small particles. The above construction will be hereinafter more fully described and claimed, and reference will now be had to the accompanying drawings, wherein like numerals of reference designate corresponding parts throughout the several views, in which—

Figure 1 is a plan of my improved grater. Fig. 2 is a longitudinal sectional view taken on the line $x\ x$ of Fig. 1. Fig. 3 is a cross-sectional view taken on the line $y\ y$ of Fig. 1. Fig. 4 is an enlarged detail sectional view of a portion of the plate of the grater. Fig. 5 is a cross-sectional view of the same, and Fig. 6 is a plan of a portion of the plate of the grater.

To put my invention into practice, I employ a piece of wire which is bent to form a handle 1, having side arms 2 2. The side arms terminate in legs 3 3, which are formed by bending the ends of the wire upon themselves. The extreme ends of the wire are bent inwardly, as at 4 4, confronting one another to form a rest or stop for a plate 5, which forms the body of the grater.

The plate 5, which is made of metal, is provided with rolled edges 6 6, through which the side arms 2 2 pass, the lower edge of the metallic plate 5 resting upon the ends 4 4 of the frame. The plate 5 is provided with rows of teeth 7 7 and 8 8, the teeth of the rows 8 being staggeredly relative to the teeth of the rows 7. The teeth are formed by cutting or shearing the plate, as at 9, to provide lugs 10, which form the teeth of the plate. The lugs are bent upwardly, as at 11, and are curved or rounded, as at 12, the shearing or cutting of the plate, together with the formation of the teeth of the plate, being accomplished by using a suitable die, which simultaneously shears or cuts the plate and gives the teeth of the plate the desired contour.

The teeth of the plate extend in the direction toward the handle 1 of the grater, thereby providing a roughened and irregular surface consisting of a plurality of teeth. As a vegetable is moved over the plate 5, the teeth are adapted to engage the vegetable and cut therefrom small particles, which are forced through the openings of the plate into a suitable receptacle (not shown) placed beneath the grater.

I desire to call particular attention to the contour of the teeth of the grater, as the small particles cut from the vegetable are more easily separated from the vegetable than if a straight or flat metallic tooth was used.

Such changes in the construction of my improved grater as are permissible by the appended claim may be resorted to without departing from the spirit and scope of the invention.

What I claim, and desire to secure by Letters Patent, is—

In a grater, the combination with a wire frame having parallel side arms, of a grater-plate having rolled longitudinal side edges receiving the side arms of said frame, and teeth struck up from said plate, said teeth being arranged in rows transversely of the plate, the teeth in one row alternating with the teeth in the adjacent two rows and each alternate row having a greater number of teeth than the remainder of the rows, each of said teeth being concave in form and having a curved rear wall joining them with the plate.

In testimony whereof I affix my signature in the presence of two witnesses.

JOHN CHARKY.

Witnesses:
    E. E. POTTER,
    C. KLOSTERMORN.